US010176397B2

(12) United States Patent
Betts-Lacroix et al.

(10) Patent No.: US 10,176,397 B2
(45) Date of Patent: *Jan. 8, 2019

(54) METHOD OF READING DEGRADED SYMBOLS

(71) Applicant: Vium, Inc., San Mateo, CA (US)

(72) Inventors: Jonathan Betts-Lacroix, Belmont, CA (US); Daniel J. Ford, San Francisco, CA (US)

(73) Assignee: Vium, Inc., San Mateo, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/338,421

(22) Filed: Oct. 30, 2016

(65) Prior Publication Data

US 2018/0121752 A1   May 3, 2018

(51) Int. Cl.
*G06K 9/00* (2006.01)
*G06K 9/46* (2006.01)

(52) U.S. Cl.
CPC ....... *G06K 9/4671* (2013.01); *G06K 2209/01* (2013.01)

(58) Field of Classification Search
CPC .................. G06K 9/4671; G06K 2209/01

USPC .......................................................... 382/176
See application file for complete search history.

(56) References Cited

U.S. PATENT DOCUMENTS

| 2013/0004076 A1* | 1/2013 | Koo | ...................... G06K 9/228 382/176 |
| 2017/0124413 A1* | 5/2017 | Deng | ..................... G06K 9/344 |

* cited by examiner

*Primary Examiner* — Ping Y Hsieh
(74) *Attorney, Agent, or Firm* — Kim Rubin, Patent Agent

(57) ABSTRACT

A method of reading degraded symbols is described. A symbol has an initial shape, which is marked on an object. Marks, shapes, symbols, and object ID are managed separately. A symbol library with symbols and associated shapes is initially created. Shapes in the library are updated from shapes of marks as the marks degrade over time. A read mark is compared to all the shapes in the library to determine a most likely shape. A selection set is used to limit symbol selection, based on the comparison, to valid symbols. The symbol library and selection set may be customized to each usage of the method. Comparison methods use probability distributions. Confidence values are used to validate output, generate warnings, and to control updating of the library. Weighted averaging may be used at the level of shapes, comparison distributions, or selections. One application is reading tattooed marks on rodent tails in a vivarium.

19 Claims, 6 Drawing Sheets

METHOD OF READING DEGRADED SYMBOLS

FIELD OF THE INVENTION

The field of this invention is reading of marked symbols that are subject to degradation over time. Some embodiments relate to reading animal identification codes marked on animals.

BACKGROUND

Vivaria house a number of animals, typically test animals, such as mice, in a number of cages, often a large number. The test animals are frequently used to test drugs, genetics, animal strains, husbandry experiments, methods of treatment, procedures, diagnostics, and the like. We refer to all such uses of a vivarium as a study. The animals in a vivarium must be observed, either manually by humans or by automated means, such as by the use of video cameras. Of critical importance in a study is correct identification of the animals.

Rodents may be marked by tattooing their tails with symbols, such as digits, a bar code, a vine code or other symbols. Animals may have a mark placed on the animal by many other methods, such as marking toes, placement of ear tags or ear notches.

The challenge in automatic identification of such marked animals is that the marking degrade, often significantly, over time. They fade, bleed, stretch due to growth, distort, become damaged, get covered by temporary detritus, and degrade from other causes.

Prior art suffers from unreliable reading of markings over time, requiring very simple codes, or suffers from both weaknesses.

SUMMARY OF THE INVENTION

A problem to be solved is how to reliably read symbols, particularly marked shapes for symbols on animals, as they degrade over time.

One embodiment uses one or more reference shapes to which the shapes of the read marks are compared, and then chooses the most likely matching shape in the symbol library. One novelty is the continual updating of the symbol library with the most recently read shape, after validation, as the new reference shape. Another novelty both minimizes the number of references symbols in a symbol library and customizes the symbol library for individual uses of the method.

Some embodiments also include location of the shape as part of identification. In this way, the same initial symbol, such as the digit, "3," may become two different reference shapes, one for each of the two location in which an original "3" occurred.

Some embodiments average multiple reads over time as the new reference shape. Some embodiments permit "backing up" to a prior reference shape. This is advantageous to handle temporary changes to shape.

Some embodiments provide warnings or errors if the confidence of a read falls below a threshold.

Some embodiments perform a validation step that includes knowledge of all possible valid shapes at the time of a read. For example, if two animals are in one cage, the first with marked, "123," and the second with marked, "456," then the digits 0, 7, 8 and 9 should never be read. If such digits are provisionally read, then a validation error is generated.

Embodiments may include a symbol library that includes only valid combinations of symbol groups. For example, using the above exemplary markings, the symbol library would include only two symbol groups, "123," and "456." Reads must compare positively to either one or the other.

DETAILED DESCRIPTION OF THE INVENTION

Figure 1A:
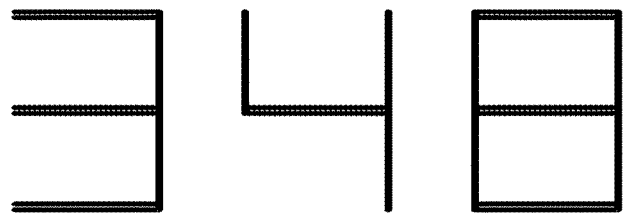
FIG. 1A shows an idealized marking ID, using a font for symbol shapes.

In one embodiment video images of rodents in a vivarium cage are generated continually or at frequent intervals. These images are used to identify animals at specific regions of a cage. This information may be used in conjunction with other information, such as animal behavior, animal appearance, or animal weight. Such observed behaviors must be associated with the consistently correct animal for study results to be valid.

Embodiments to locate one or more markings on an animal tail may include finding the body of the animal in the cage, finding the tail position, selecting from the video image a portion containing the tail, straightening the tail, finding locations of marks, isolating the marks, then using that portion of the video, that contains a mark, to read the mark per embodiments herein. Various "front end" image processing steps may be used, such as adjusting for lighting, contrast, light source, distance to camera lens, and the like. Filters may be used to ignore undesired video frames. Averaging may be used to reduce noise or blur.

Basic embodiments have an "outside loop." Each successful iteration of the loop generates one animal ID. Each iteration of the loop uses the most recent image of the symbol to replace or update the prior reference symbol, subject to optional validation and averaging. Each iteration may deal with multiple symbols, which may be part of a single animal ID.

Different embodiments use different methods of averaging reads to update the reference shape of a symbol. At one extreme, each read simply replaces the prior reference image. At the other extreme, all prior reads are averaged, then that average becomes the reference shape. Another averaging method includes an exponential or linear decay of reduced weighting for older reads. Another averaging methods averages a fixed number of prior reads, equally weighted. Another averaging method includes using confidence levels of reads, after symbol identification, as weights for averaging.

Another embodiment includes using post-read validation based on allowable symbols, allowable sequences of symbols or allowable complete animal IDs. Only reads that have passed a validation step are used for any updating of reference shapes or libraries.

Updating Reference Shapes

Processes, steps or algorithms for updating reference shapes may be viewed as a combination of (a) algorithms known in the art; and either: (b1) steps or algorithms unique to either embodiments of this invention or (b2) steps or algorithms that are specific to one implementation of an embodiment, or both (b1) and (b2).

The input to such updating may be a single image, portion of an image, representation of the image or portion, such as vectors; or the output of a function applied to the image or portion, such as the output of a feature recognition or feature mapping algorithm, or the output of a transform, such as Hough transform, for example.

In addition, preprocessing may used, such as cropping, lighting correction, contrast correction, noise reduction, straightening, distortion correction, scale correction, and the like. Some validation may be done at this preprocessing step. For example, noise may be excessive, or lighting too poor, or scale correction out of bounds. If any such validation so fails, then updating of any associated reference shape is stopped.

Averaging may be used as part of such preprocessing. That is multiple sequential video frames may be analyzed. Motion between such frames may be tracked and correct for, such that averaging does not introduce motion blur.

Such above preprocessing steps may all be done as part of a "read" step in an embodiment, where such reads a physical mark to generate a shape.

A first method of updating a shape, given the output of a "read," may use that shape to replace a prior reference shape. This simple method effectively uses, in English, the "last read" shape as the new reference shape.

A second method of updating a shape, given the output of a "read," may add that output to set of all prior read outputs. This "full history" set may then be averaged and that average becomes the new reference shape. The elements in the fully history set may be weighted as part of the averaging. Such weights may be time-based (e.g., more recent entries are given a higher weight) or based on a confidence factor associated with the output of the read.

A third method of updating a shape, given the output of a "read," may add that output to a limited set of prior reads. This limited set may be based on time, such as all reads in the past, day, week or month. This limited set may be based on a number of reads, such as the last 5, 10, 30, 100, 300, 1000, or 5000 reads. The elements in the partial history set may be weighted as part of the averaging. Such weights may be time-based (e.g., more recent entries are given a higher weight) or based on a confidence factor associated with the output of the read.

A fourth method of updating a shape, given the output of a "read," may add that output to a time-weighted set of prior reads. This time-weighted set may be based on time or based on a number of reads (despite the name given in this paragraph). One such weighting is exponential, another such weighting is linear. This "fixed" weighting may be combined with weighting based on a confidence factor associated with the output of the read.

Fifth, averaging may take into account repetitive changes, such as light cycling on a 24-hour schedule. One such case averages only with blocks at the same offset from midnight, such as the use of hourly blocks. Another such case uses only two blocks: day and night. This may be viewed as having a "daytime shape" and a "nighttime shape." This embodiment is specifically claimed. Another such case uses blocks associated with light source: such as with IR lighting v. daylight lighting; or streetlights on or off; or direct illumination (such as sunlight or another shadow-creating source) v. indirect light.

Sixth, other methods of weighing and averaging are known in the art.

In general, references to a "reference symbol" may also apply to set of distinct symbols or to a range of possible reference symbols. Note that because the symbol library associates one or more shapes with a symbol, discussion of a "reference shape" or "reference symbol" may include or apply to a the associated "reference symbol" or an associated "reference shape."

In general, references to a "symbol library" may also apply to library of one element, that is, a single reference symbol or single reference shape. A symbol library may carry images for all possible symbols, such as all digits, all alphanumerics, or all elements of a bar code symbology. A symbol library may carry only those symbols that might occur in a single cage, on a single animal or in a single location on a single animal. Smaller symbol libraries have the advantage of generating a correctly matching symbol with higher confidence than using a larger reference library.

With respect to image processing, once we have a portion of a video image containing, hopefully an image of the mark and as little additional imagery as possible, we define for convenience the following general steps:

(A) Preprocessing. This optional step is typically performed first. It may include: adjusting for lighting, contrast, light source, distance to camera lens, and the like.

(B) Comparing. Comparing is discussed in more detail below. The output of the comparing step is often a set of possible features and their corresponding confidence values. Typically, a compare function or compare method is used. It is useful to consider two types of feature mapping algorithms (although many classification systems exist): those that work with a known set of features, such as a set of digit images, and those that will create a set of possible features. The set of possible features may be the shapes in the symbol library. Embodiments use highly selective libraries, where the library, first, consists only of applicable symbols for each separate use of the method, and second, one or shapes in the library are updated during iterations of the method. That is, the symbol library for the comparing is continually updated as the mark representing the symbol morphs over time.

(C) Selecting. This step takes as input the output of the comparing step. It then selects one symbol, or possibly more than one symbol. Typically a select function or select method is used. This selection might be as simple as selecting the symbol associated with the shape with the highest confidence. This step may include within it a validation step, as discussed elsewhere herein.

(D) Animal Identifying. This step takes as input the output of the selecting step. It then generates the animal ID as required for use within the system. For example, and animal ID may be a local or global index into an animal database, or a specific animal object in an object oriented language. Typically an ID function or ID method is used. The selecting step or select function may output an animal ID directly, making the ID function, in this case, potentially a passthrough function or unneeded. This step may also be a validation step or recording step. This step may be inside of another step, such as selecting or validating.

(E) Validating. This optional step compares the out of the selecting step—which may include multiple symbols for one animal, with possible symbols at the time of the read. For example, valid animal IDs will be for animals that are in the cage. Validation is not part of image processing, per se, but may be used to accept, modify or repeat image-processing steps. For example, the selecting step might choose two provisional symbols. The validation step then tests both possible symbols. If exactly one provisional symbol passes validation, then that symbol is used.

Another embodiment uses reads from multiple sources, which may be multiple locations on one animal or locations on different animals to update the symbol library. While this has the disadvantage of not being specific to degradation unique to one location on one animal, it has the advantage of averaging degradation that is in common with most animals. For example, most markings fade with time; that is, they become lighter. Also, most markings bleed with time; that is: the line width expands. Also, for some groups of animals, animal growth may produce reasonably consistent stretching or other consistent distortion.

Compare Functions

Processes, steps or algorithms for compare functions (also called comparing steps) may be viewed as a combination of (a) algorithms known in the art; and either: (b1) steps or algorithms unique to either embodiments of this invention or (b2) steps or algorithms that are specific to one implementation of an embodiment, or both (b1) and (b2).

Compare functions or algorithms typically try to match a shape of interest to shapes in a library. In the art, such shapes are often called features, and the compare functions or algorithms are referred to as feature identification, feature extraction, or feature mapping. One shape of interest in some specific embodiments described in more detail in claims and enumerated steps is a "shape" that comes from reading a "mark" on a tail. Each shape is associated to one symbol, such as a digit or portion of a barcode, or an arbitrary symbol associated with an arbitrary shape. The goal of methods is to identify the most likely shape, and thus the most likely symbol. As the mark morphs, the corresponding shape in the library is updated.

One compare function computes a hamming distance in a multi-dimensional space. Typically the coefficient for each dimension is one measured attribute, or one output from a feature identification, feature mapping or feature comparison algorithm. As a particularly simple example, an image may be broken into array of sub-images. The value (i.e. brightness on a scale of black to white) of image sub-image may a coefficient in one dimension. Values within areas within a Hough transform may be used as a coefficient in a dimension.

Other embodiments of compare functions use other algorithms for computing "distance." These include, as non-limiting examples, L1, L2 and Metropolis distances.

Compare functions often use feature identification, feature mapping, and feature extraction algorithms such as: HAAR, ORB, SIFT, SURF, Neural nets, convolution, FAST/BRIEF, STATA, convolutional neural nets, Pierson correlation, Tanimoto coefficients, a Jaccard index, Tsallis mutual, entropy measurement methods, clustering algorithms, Hough transforms, and clustering algorithms or cluster analysis. Additional feature extraction algorithms are identified and discussed here: https://en.wikipedia.org/wiki/Feature_extraction. Feature extraction algorithms may be generally grouped as one or more of: edge detection, corner detection, blob detection, ridge detection, and scale-invariant transforms. For recognizing symbols on rodent tails, a good choice feature extraction algorithm depends, in part on what upstream operations have occurred. For example, if no preprocessing is done, and video input consists of a view of an entire cage, then scale-invariant and rotationally invariant algorithms are preferred, because the position and angle of the rodent tail are not known, nor is distance to the camera (scale). However, if a rodent has been located, the rodent tail located, the rodent tail straightened or otherwise its angle and/or curvature identified (such as a piece-wise or spline model of the tail position), and an expected location of a tail mark identified, then feature extraction algorithms that use known scale and angle are preferred.

For locating edges of a tail, edge detection algorithms are a good choice. Preprocessing might use only gradient (differential) information from a video image. Also, Hough transforms are suitable for identifying tail location, once a rodent body has been identified. Locating a rodent within a cage may use a blob detector. Corner detection may be used to identify the corners of a symbol. However, this type of algorithm may not be effective on blurred or diffused tattoo markings.

Cluster analysis or clustering algorithms are particularly useful when degradation is significant, or when starting symbols or starting locations are now well known. A list and then discussions of clustering algorithms is here: https://en.wikipedia.org/wiki/Category:Data_clustering_algorithms. A K-means clustering or nearest neighbor algorithm is often a good choice or staring point for applications and embodiments discussed or claimed herein. Such clustering algorithms are particularly useful when the considering multiple marks at once.

Blob detection may be used to first locate marks on a rodent tail, or to locate marks within a whole or partial cage image.

The input to compare functions is typically the current shape and the current symbol library. The symbol library may also include a history of shapes corresponding to one symbol. For example, the symbol, "3," may have multiple shapes, all of which are associated with "3."

A key novelty is updating the shapes in the library with read shapes, with or without some averaging of prior shapes for the same symbol. Another novelty is using a library that is restricted to only applicable symbols for an individual current use of a method. For example, rodents in one cage may have only symbols, "3," "5," "7" and "1" tattooed on their tails. For this cage, only shapes for those four symbols will be the symbol library. In some embodiments, particularly embodiments for arbitrary symbols, for each individual use of a method at least part a symbol library is created by first reads of the object or animal. Animals may first read while they are still in the marking machine. One embodiment of validation is to confirm, using a database, that the read animal ID is supposed to be in the cage in which the read occurred. Yet another embodiment is using the same video camera to read a cage ID as reading the marks on animals in the cage. As another example, if a method is being used to locate within a city block, only building shapes known to be on that block will be in the library. For these examples, a different library would be used for each cage and each block.

FIGURES

Turning now to FIGS. 1A through 1D, we exemplary degradation of three symbols over time. FIG. 1A represents the symbols 3, 4, and 8 in an idealized orthogonal, straight line-segment font. Such a font type is a good choice for tattooing on rodent tails as such line segments are relatively easy to tattoo consistently. FIG. 1A may represent a starting point is a font is used as a starting point, rather a first read of an animal mark.

Figure 1B:
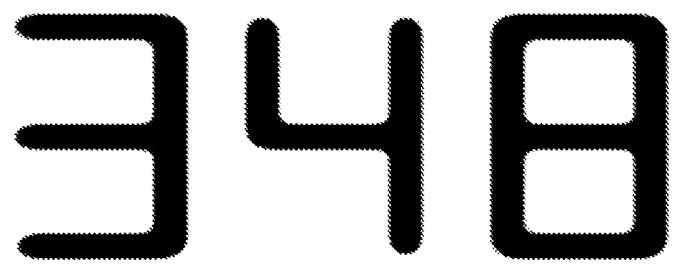
FIG. 1B shows an exemplary marking as first marked on an animal.

FIG. 1B shows an idealized read of a mark as tattooed. Note the wider line width. This Figure may also be used as a "first read" representation. This Figure may also be interpreted as a font, if a font that looks like this exists.

Figure 1C:
FIG. 1C shows an exemplary marking after degradation.

FIG. 1C shows how the marks change and degrade over time. The line segments may shorten from the end, widen from in ink diffusion; stretch from growth, and otherwise distort and blur. FIG. 1C is still idealized in that it is shown in solid black or white contrast, due to the limitations of patent drawings. Actual reads from a video camera of a real rodent tail are not nearly so clear.

Figure 1D:
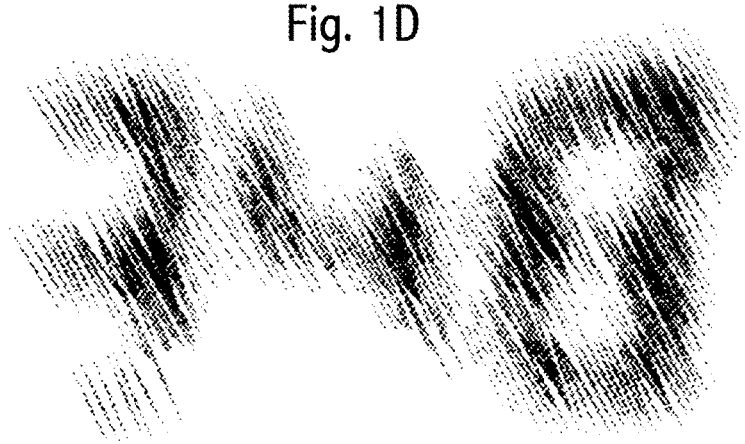
FIG. 1D shows a representation of a gray-scale video image of FIG. 1C.

FIG. 1D is a representation of a more realistic camera video image within the constraints of patent line drawings.

Figure 2:
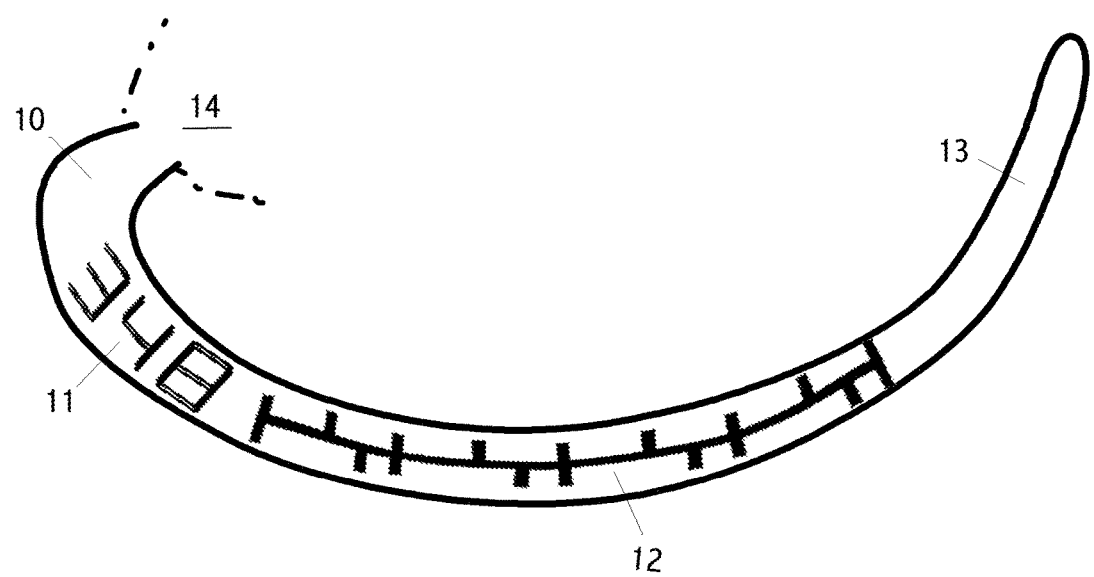
FIG. 2 shows two exemplary markings on a rodent tail.

FIG. 2 shows an exemplary human-readable marking 11 and an exemplary machine-readable marking 12 on a rodent tail 13. 10 is the body end of the tail; 13 is the tip of the tail. 14 shows a partial rodent body.

In some embodiments the human-readable marking is also machine-readable.

In some embodiments, the human-readable marking portion is unique within a first population, such as a single study. In some embodiments, the combination of the human-readable marking and the machine-readable marking is unique for all live animals in a vivarium. In some embodiments a combination of the human-readable marking, the machine-readable marking, and a read time is unique for all suitably marked animals in the vivarium, independent if the animal is dead or alive.

In some embodiments, the selection of human-readable markings, or the selection of machine-readable markings, or both, are selected on the basis of maximizing Hamming distance of sub-symbols (i.e., Hamming symbols) within the marked codes.

Not all embodiments have the above limitations.

Continuing with FIG. 2, we see both a human-readable marking 11 and a machine-readable marking 12 marked on a rodent tail 13. The rodent may be a mouse. The method of marking may be tattooing.

Continuing with FIG. 2, the machine-readable marking portion 12 may be a vine code, with or without a spine. It may be a barcode known in the art. The spine is aligned with the tail such that the code is easy to read with machine vision, as the spine clearly demarks the location and curvature of the tail, and also provides a reference point for determining if the bars, (or "leaves") in the code are left, right, full-width or null. A rodent tail may not only curve dynamically with rodent activity, but also rotate around the tail axis. The tail may also curve upward. Thus, a code spine is valuable to determine all such distortions from an ideal, flat, rectangular, fixed substrate for the code marking. In addition, the tail may be partially covered with detritus, such as bedding or other material. A continuous spine makes if far easier to determine reliably if a portion of the machine-readable marking is so obscured. In addition, a printed spine may be used to determine the start and end of the printed code; that is, the locations of the first and last leaf. This is particularly important when the first or last leaf is a null leaf.

Prior art required white or black cage bottoms to machine-read a tail barcode. Prior art required cages to be free of bedding, as that might obscure a portion of the code, causing a misread. Use of a vine code with a spine eliminates these requirements as the dark markings on a light tail provide sufficient contrast, and use of a spine does not require that the edges of the tail be identifiable.

In some embodiments, either the human-readable or the machine-readable marking portions 11 and 12 respectively is an identifier within a known scope. In some embodiments such a scope might be all animals in a study or in a set of cages, or require a particular procedure or observation. In some embodiments the scope is all the live animals in a vivarium. In some embodiments the scope is all the animals in a group of vivaria.

In some embodiments the combination of the human-readable and the machine-readable marking portions is an animal identifier within a known scope, such as all live animals.

The combination of the human-readable and the machine-readable marking portions may be a third animal code, where the third animal code must be looked up in a third animal code mapping table comprises an entry (field) comprising to a primary key that uniquely identifies an animal.

The code space of the machine-readable marking portion may be no more than 10,000; 100,000; 1,000,000; 10,000,000; or 100,000,000. The code space of the machine-readable marking portion may be no more than 12 bits, 14 bits, 16 bits, 18 bits, 20 bits, 22 bits 24 bits, 26 bits, or 28 bits. The code space of the machine-readable marking portion may in the range of 12-14 bits, 12-16 bits, 14-18 bits, 16-20 bits, 18-22 bits, 20-24 bits, or 22-28 bits, 14-20 bits, or 16-28 bits. The machine-readable marking portion may or may not comprise check bits, parity bits, checksums, CRC, and forward error correction.

The animal in FIG. 2 on which both a human-readable marking and a machine-readable marking have been placed may have no additional placed markings. Indeed, the ability to identify animal with no additional markings are the benefits of key embodiments.

Figure 3:
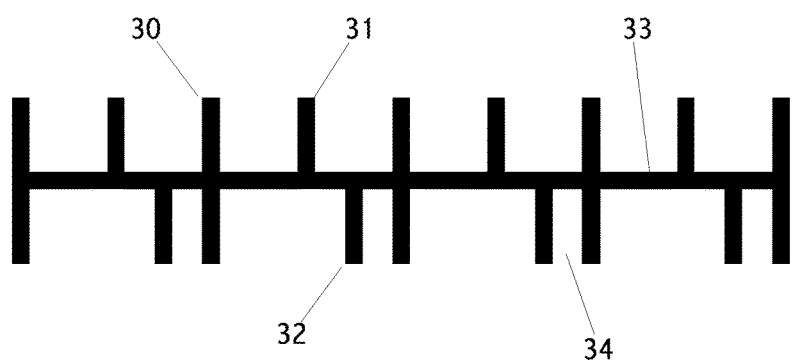
FIG. 3 shows an exemplary vine code.

Turning now to FIG. 3, we see an exemplary vine code of one embodiment. 30 is a full-width leaf. 31 is a right leaf. 32 is a left leaf. Location 33 shows a null leaf. 34 shows a fixed-width gap between leaves. Null leaves, such as 33, are detected by noticing that the gap between adjacent leaves is twice the fixed-width gap 34 plus the thickness of one line segment. A null leaf is also detected when the start or end of the spine extends past the last visible leaf. Note that the prior art code in FIG. 2 does not have null leaves.

In some embodiments, each leaf of the vine code may encode two bits each. In some embodiments, two bits may be encoded as one of: (i) a right leaf 31; (ii) a left leaf 32; (iii) a full-width leaf 30; or (iv) a null leaf 33. In some embodiments a leaf that is longer than a full-width leaf may be used to indicate a deleted leaf position or a marking error. In this Figure, line width is not part of the coding. In this Figure, the spacing 34 between leaves is fixed: line thickness is not part of the coding. In one embodiment, line spacing 34 is not fixed and is not part of the coding either. An advantage over prior art is that by ignoring line thickness in the coding, the significant real-time and growth-based dynamics of a rodent tail do not distort the marked code so as to reduce the reliability of reads or cause misreads. Even if any such misread rate is low, the misread rate is not accurately computable. In addition, both line thickness and line spacing are difficult to control when tattooing, whether the tattooing is done manually or by a robot.

An exemplary vine code, such as shown in FIG. 3, may encode 8-14 bits, 12-16 bits, 14-18 bits, 16-20 bits, 18-22 bits, 20-24 bits, or 22-28 bits, 14-20 bits, or 8-28 bits. The vine code may or may not comprise check bits, parity bits, checksums, CRC, and forward error correction. Specific vine codes to mark may be selected such that a Hamming distance, where the "Hamming symbols" are each short line segment in a leaf, is maximized amongst all used codes, or amongst a subset of used codes. All leaves in the shown code have two short line segments. A full width leaf has two marked short line segment regions. A null leaf has two unmarked short line segments. Left and right leaves have one marked and one unmarked short line segment.

Figure 4:
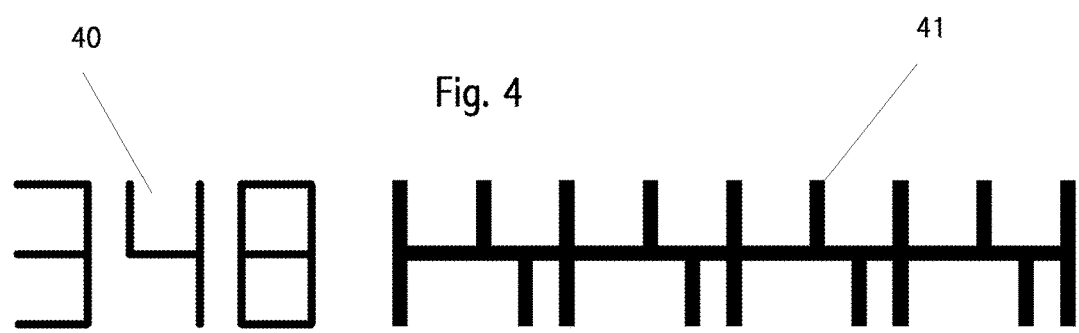
FIG. 4 shows a combination of digits and a vine code.

Turing now to FIG. 4, we see an exemplary combination of both a human-readable marking portion 41 and a machine-readable marking portion 42. Here the human-readable marking 41 is of the number 348. The characters are printed in the common "seven-segment" format. However, other fonts or character formats may be used. The machine-readable marking 42 is a four-leave vine code where each leaf is one of four possible leaf symbols. This code marking has a spine, which is vertical in the Figure. The top-most leaf is full-width. The second leaf is null. The third leave is right. The fourth leaf is left. Thus, 42 in this Figure shows all four leaf symbols. This code encodes 2*4=8 bits, or 256 possible input values. The three-digit numeric marking codes 1000 possible input values, from 0 to 999. Thus, the combination of the human-readable marking and the machine-readable marking encodes 256*1000=256,000 possible input values.

Figure 5:
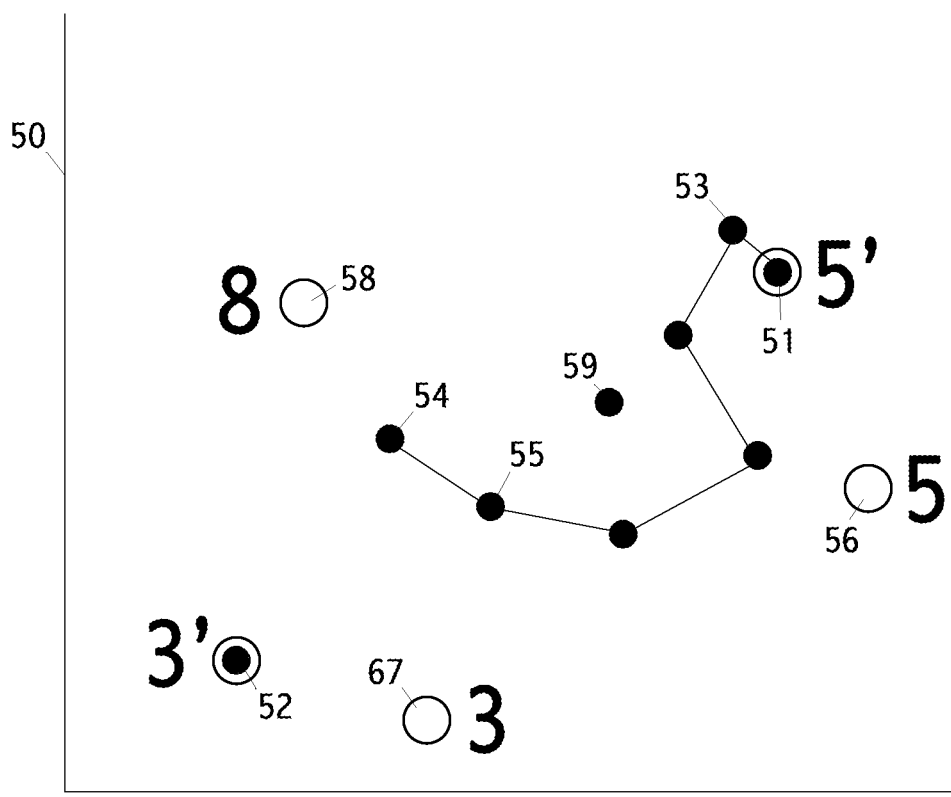
FIG. 5 shows a conceptual, two-dimensional representation of degradation of a mark.

Turning now to FIG. 5, we see a depiction of "distance" between shapes, or read marks. The axes, 50, are arbitrary dimensions, that is, two coefficients in a multi-dimensional space. Typically, many more than two dimensions are used. However, this two-dimensional depiction is suitable to explain the concept of distance. Two shapes are shown, 51 represents a shape for the symbol, "5," and 52 represents a shape for the symbol "3." Symbols may be arbitrary, rather than necessarily having a close visual relationship to the mark. Over time the degradation or change of the shape starting at 51 is shown schematically as the path from 51 through 52 to 54: dots connected by lines. Degradation of the shape for "3," 52, is not shown. Each dot, from 51, following the connecting lines to 54 represents one "read," or a selected series of reads, of a mark, such as a tattoo on a rodent tail. Note that over time the mark for the symbol "5" starts to look much closer to the shape for symbol "3," 52. Closer distance in this Figure may be very roughly compared to a human's perception of "looks similar to."

Embodiments use each of the series of dots from 51 to 54 to update the starting shape, the reference shape, for each read. Thus, at the start, shape 51 is used to recognize shape 53. In particular, to recognize shape 53 as being closer to shape 51 than to shape 52.

Note that after time, the shape for the symbol "5," now shape 54, is actually closer to the starting shape for "3," 52 than to its original shape 51. However, shape 54 is closer to its previous shape 55 than to shape 52. Thus, it is recognizable to be the shape for symbol, "5."

Different embodiments use different starting points. The shapes with circles around them, 51 and 52, represent the "first read" of a mark. This is the "mark as drawn." It might be from an image taken immediately after tattooing, such as in the machine shown in FIG. 7. The open circles, 56, 57, and 58 represent shapes based on a font. In one embodiment these might be starting points. In such a case 56 would a starting point with 51 being the first read. Shape 51 would be recognized as being closer to 56 than to 67.

The large type: 3, 3', 5, 5' and 8 for dots 67, 52, 56, 51 and 58 respectively, show associated symbols for those dots. Note that an "8," 58 looks a little like a "5," 51 and a little like a "3," 52. Thus, if one has only two symbols to distinguish, a choice of "3" and "5" would a better choice due their larger distance than "3" and "8." Note that over time, the shape for "3," now dot 54, is quite close to the font shape for "8," 58, showing why shape 58 may not be a good choice in this application.

Dot 59 shows an "average" location of all connected dots from 51 through 54. Averaging is discussed elsewhere herein.

Note that a "font" may not be a known print font, such as Helvetica, but may be a specialized font, such as appropriate for tattoo symbols on a rodent tail.

Also note that all fonts and symbols may be for or from a 1D barcode, 2D bar code, matrix code, or vine code symbols or portions, including line segments, terminators, targets, or spines.

Euclidean distance in the two-space of the Figure would be a straight line between two points.

Figure 6:
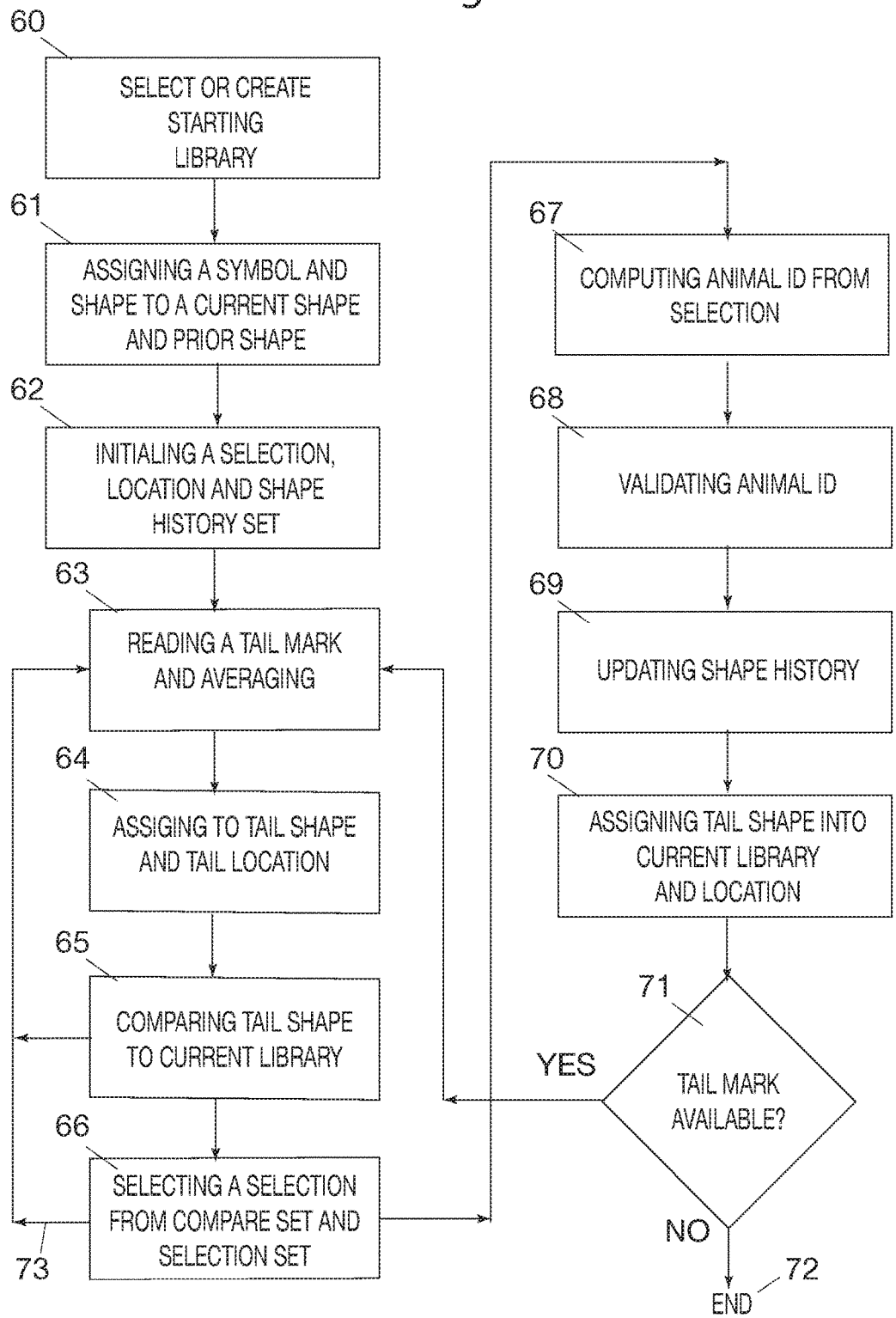
FIG. 6 shows a block diagram of an exemplary embodiment.

Turning now to FIG. 6, we see a flow chart of an exemplary embodiment. Step 60 selects a starting library of shapes if the shapes are known in advance. For embodiments that create all or part of the symbol library from initial reads, that is done in this step. In one embodiment these are canonical shapes from a font or perfect barcode element. Representation of such shapes may be pixel or voxel based images with or without a z-axis, bit maps, vectors, or other representations. A key aspect of this library, in some embodiments, is its specificity to a each particular use of a method. For example, the markings on animals in one cage consist of a set of specific symbols, such as a subset of digits. The library will be restricted to only shapes corresponding to those symbols. The library may be all digits, or all possible elements of a specific type of barcode or vine code. Other types of libraries are discussed elsewhere herein.

An alternative embodiment uses as the starting library shapes that have actually be read, that than an idealized font. Thus, in such embodiments, sometime prior to the start of the iteration loop, step 63, one or more reads are performed to create the initial library in step 60. Steps 60, 61, and 62 may generally be performed in any order. An advantage and some embodiments are that there is no "font" for the shapes used. For example, if shapes are natural markings on an animal or human, or buildings, or elements of a landscape, there is no font and so the initial library is then created from initial reads. Note that although there may not be "fonts," as such available, there may still be idealized forms for a symbol, such as a typical restaurant in a known chain, a standard crosswalk, or a "universal" face.

Step 61 initializes a starting symbol and shapes. Step 62 initializes a selection, and a location or location and shape history sets, if these are used. Such initializations 61 and 62 may be null or empty, or may create a starting place for the method embodiments. For programs, such initializations 61 and 62 type, instantiate, and assign initial values for variables, structures and objects, as necessary prior to iteration. For claims, initializations 60 and 61 create antecedents prior to iteration.

Step 63 is the start of each iteration. As discussed elsewhere herein, "reading" and "tail mark" are to be broadly construed for other embodiments, such as substituting the word "mark" for "tail mark," or vice-versa, for all steps in all embodiments. This step creates an image from a physical or virtual source, which contains the "mark." Typically, a camera or imager of some type is used in this step. As discussed herein, this step may include waiting for an appropriate time, availability of a mark to image, averaging of multiple images, such as multiple video frames, and basic image processing steps (also called "preprocessing") as discussed elsewhere herein. Averaging and other image processing is optional.

Step 64 assigns all or a portion of the image from step 63 to a shape, and optionally to a location, such as a location on a rodent tail, or a physical location such as coordinates. Representation of a "shape" may vary by embodiment. It may be a pixel or voxel based image, with or without a z-axis. It may be vector-based or curve or spline based. It may be a blob or a distribution function. It may be data in a multi-dimensional space or transform data. It may comprise confidence values or be a tensor space. In a simple embodiment, it is a rectangular, gray-scale pixel-based image. In a minimal embodiment, the shape is the read image.

Step 65 compares the shape from 64 to a current library of shapes. Compare functions are often complex, as discussed elsewhere herein. They may a combination of a known feature identification, extraction, and mapping algorithm plus embodiment specific or application specific steps or parameters. Typically, but not necessarily, the output of this comparing step is a complex structure, such as a distribution function, or a set comprising element-confidence pairs. The library may have a one-to-one correspondence with shapes and symbols, or may have multiple shapes that are associated with a single symbol. In particular, it may have a history of read shapes for one symbol. In another embodiment, the library has multiple shapes from multiple sources, such as multiple animals, for a single symbol, such as the digit, "3."

The output from step 65 is called the "compare set," whether step 65 is executed once or multiple times such as in a cycle shown by arrows 73.

Step 66 selects from the output of the comparing in step 65, one or more shapes. In some embodiments, the restriction of the library to only actual symbols and corresponding shapes used in one application of a method occurs in this step. For example, the library may comprise shapes for all ten digits. However, only four digits are known to be properly used in one cage, and so the selection is restricted to selecting only one of these four digits, even though the comparing step considered all ten digits. Thus, some embodiments customize the selecting step to a restricted set of options for each application of a method. In some embodiments the compare set consists of the symbols used in the current shape library. The selecting may include validation. It may include a preferred and alternate selection. It may include a confidence value. It may output "no selection." It may output a warning. See also other discussion herein on selecting.

Steps 63 through 66 may be repeated for multiple marks, as multiple marks may be needed in order to compute an in step 67. Such repeating is shown by arrow 73. A benefit of an embodiment that uses repetition as shown by arrow 73 is the following selecting step select from a group of symbols, such as "123," rather than individual symbols, "1," "2," and "3."

In some embodiment this repeating to read multiple marks is a repeat from step 63 through 65, also shown with an arrow, where the selecting step in 66 occurs after all marks have been read. It then selects from the complete set of all shape comparison. For example, if an animal is marked with "348," each mark, "3," "4," and "8" are read and their shapes compared in steps 63 through 65. Then, the selecting step tries to select "348" from all three comparing steps. This has the advantage that the number of selection options is may be decidedly more limited. For example, if there are two animals in a cage, one marked with "348" and the second marked with "167," the selecting much choose either 348 or 167, which is the better choice. That is the closest match, as discussed elsewhere herein, such as "shorted distance." In this example, "348" and "167" are the only two entries in the selection set.

Step 67 uses the selection (or more than one) from step 66 to compute an animal ID, or an other identification for embodiments not using animals. Examples include a street address, building type, location coordinates, and the like. In a minimal embodiment the selection from step 66 is the ID. In other embodiments, additional work is needed, such as looking up the selection in a database, or other modifications. As one example, the selection step might output "348" as the symbols marked on an animal. The animal may be in a cage numbered 1290. The full animal ID may be 1290-348. In another example, a database entry shows that as of the read date and time, the animal marked "348" has animal ID, "XYZ12399-AA." As another example, a street address or latitude and longitude location may be appended to a selection. In another example, a melanoma ID or patient ID may be appended to or replaces a selection.

Step 68 is an optional validation step. It may be in the sequence shown in this Figure, or in a number of other places or more than one place. A key aspect is that some validation may be done prior to updating the shape history, prior shape or the library. Validation may be built into a prior step. For example, the electing step 66 may inherently perform validation because it will only select valid selection. If the selecting step, or any other step, has "no output," then that iteration terminates.

Steps 69 and 70 update the shape history, the prior shape, and the shape library, depending on which of these are in used in the embodiment. The update may be dependent on more that just a valid ID from step 68. For example, a selection may be sufficiently robust (e.g., the confidence value meets a threshold) to be used for animal identification, but not so good as to update the shape history. In some embodiments, the shape history may be updated 69 but not the library 70.

Step 71 causes the iteration to repeat from step 63. If no mark is available for reading, then the method terminates 72.

The exemplary embodiment shown in FIG. 6 does not describe the rate at which the iterations repeat or the rate at which read are performed. Each iteration may occur based on conditions unique to each application. Iteration rates may be fixed or they may depend, often, on the availability of a mark to be read. Read rates from a video camera may be 24 frames per second, but may be very much faster or slower. Entering an iteration cycle at step 63 may be thousands of time per second in a high-speed application, or only one time ever, or annually. For animals in a vivarium, it may be desirable to read an animal ID at all times that the animal is visible. Thus, an iteration rate may be once per second with a camera frame rate of 24 frames per second. Iteration rates may range from one per day to 30 times per second. Another range may be once per hour to once per second.

Figure 7:
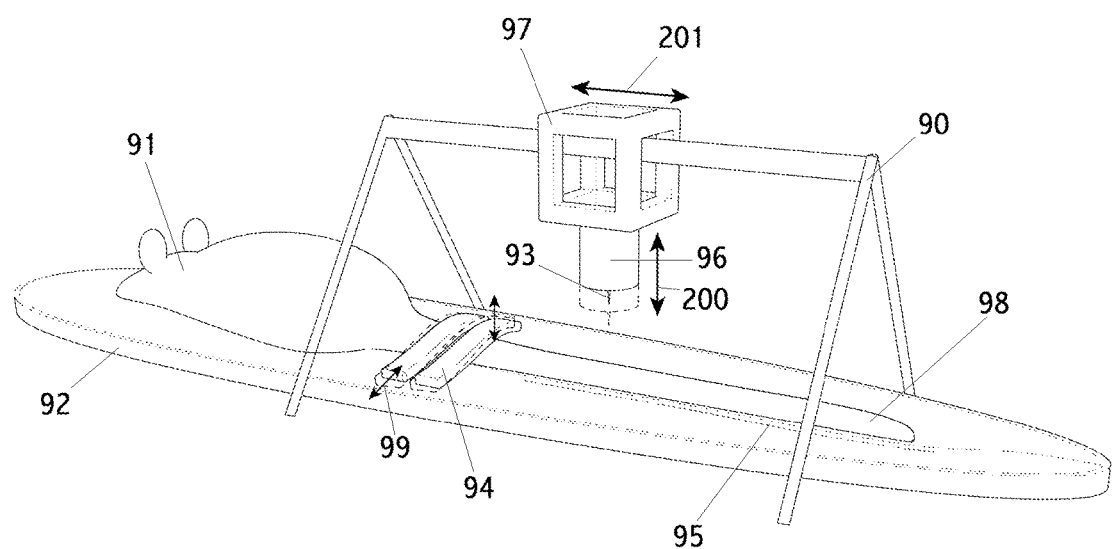
FIG. 7 shows an exemplary mouse-tail marking fixture.

Turning now to FIG. 7 we see an automated or manual marking machine. Here, 50 is a mouse on a work surface 51. Rollers 55 are used to roll the tail back and forth. Such motion may be used to mark line segments perpendicular to the tail, 57. 56 and 57 show the mouse-tail. 56 is nearer the tip of the tail; this region is not suitable for marking. 57 shows a tail portion closer to the body of the mouse; this region is suitable for marking. A marking head, such as a tattooing head is shown as 53. The head is supported on a frame, 52. The head is capable of two directions of motion as shown by the arrows: axially along the tail and vertically to raise or lower a tattoo tip, 54. Initial reads may be executed while an animal is in this machine.

Core Embodiments

A *nexus* of core embodiments are directed to steps to track and use a continually self-modifying mark, particularly on a rodent tail, as a basis for future recognition of the mark as one of a set of known symbols. Embodiments are not directed to "feature extraction" algorithms by themselves. Embodiments may be directed and are so claimed as embodiments for other applications, such a recognizing buildings, locations and blocks in cityscapes; natural features or locations in non-human created environments; faces and facial features; features in aerial recognizance images; changes to ground features such as construction or decay (legal or illegal); changes in plant growth, natural or planted crops; changes to room environments such as changes to lighting, movement of furniture and items, and the like; changes to scenes monitored by video, such as conference rooms, lobbies, or security and safety applications; zoo enclosures; and changes to traffic intersections, particularly due to lighting changes such as over the course of a day or due to clouds; medical applications, such as changes to tissue, bone, fetus, cells, melanomas, circulation, cardiac function, breathing and other long-term or short-term changes in live organisms. Medical applications include normal and abnormal growth and development, shrinkage, remission, and atrophy. For such above embodiments, location may a physical location such as earth coordinates or an address, or coordinates on or in a body, or location information in a virtual space.

Notes on Claims

Notes below are on claims as numbered in the original filing. Numbers below may not correspond to claim numbers as issued.

For original claim 1. An animal identifier may be unique for an animal multi-housed in a cage with another animal; or may be unique within a study, or unique within one vivarium, or unique within multiple separate vivaria. A selected symbol library may contain symbols in used only in one cage. For example, if one animal is marked with (123) and a second animal is marked with (456) the symbol library may contain only symbols and corresponding shapes for {1,2,3,4,5,6}. Thus, a symbol library may be selected, customized, restricted or created for each cage separately. Shapes, in the symbol library, associated with symbols in the symbol library, may be from a known font, such as Helvetica, or from a specialized font such as one developed for tattooing on rodent tails, or may be created from shapes read from marked animals. The term "mark" refers to an actual marking on an actual animal. The term "shape" refers to a data structure usable in computation. Reading, comparing, selecting and computing are discussed elsewhere herein. A compare step may output a distribution comprising a probability or confidence value for each shape in the symbol library. The updating step may comprise an exact copying of a shape data structure, or it may be more selective, such as changing data format, or averaging, and may comprise validating or conditional updating. Marks may no longer be available for reading for a variety of reasons, such as the animal is not in a cage or the animal is not currently visible to the reading device. Iterations may occur at regular time intervals or may be based on other criteria, as discussed elsewhere herein. Symbol libraries may be updated with a different set of symbols during execution of the method, in particular, between iterations.

For original claim 2. One symbol may be associated with more than one shape. For example, the symbol "0" may have one shape without a slash and one shape with a slash. Multiple shapes associated with one symbol may be known in advance, or may be created based on how marks are actually marked or read on an animal. For example, a technician may mark a shape for symbol "4" strangely on an animal. It is then useful that the corresponding symbol in the symbol library be associated with that strange shape. It is then that strange shape—not some other shape—that is updated via iterations of the method. An alternative embodiment to "updating" a shape in the symbol library is to rather "add" a shape to the symbol library, associated with an existing symbol, for any embodiment.

For original claim 3. This embodiment not only updates shapes as the corresponding mark morph on the animal with time, but also updates the location on the animal of the mark. If an animal grows, for example, the mark may shift on the tail. Updating the location may be reasonably straight forward, using the current location to update the prior location or a location history. Typically, some averaging with prior read locations is appropriate. Embodiments may create and use a location history. Step (b') initializes prior and current location variable or objects. Note the "reading" step now comprises determining or recording a location of the mark, as indicated in step (c').

For original claim 4. There are many ways of "averaging," as discussed elsewhere herein. Averaging may be done using shapes or may be done using the output of the compare step. Averaging may use only the current shape.

For original claim 5. This embodiment implements "backup" to a previous shape. A mark on an animal may altered temporarily, such as due to detritus on the animal, temporary inflammation, due to lighting or another cause. Changes to a building or street may be temporary due to construction. By comparing to multiple shapes in a shape history, it may be possible to determine that a current shape more closely resembles a prior shape that a recent shape. In such a case it is desirable to delete or reduce the weighting of the more recent, but no longer as applicable, read shapes in a shape history. It may also be desirable to update the corresponding shape in the symbol library similarly.

For original claim 6. A warning may be generated with an animal ID that is reasonably confident, but that the quality of mark, read, shape, comparing or selecting is less robust than desired. Such a warning may use effectively the same criteria as validation. However, it is advantageous to identify a mark that is degrading prior to being unusable for reliable determination of animal ID.

For original claim 7. Non-contiguous shapes may be a sequence of digits, alphanumerics, slashes or other simple marks, elements of a bar code or matrix code, or elements of a vine code without a spine, as non-limiting examples.

For original claim 8. Continuous symbols may include elements of a barcode or matrix code where the spacing between elements is important, script fonts, a vine code with a spine, or wavy lines, as non-limiting examples.

For original claim 9. Vine codes with a spine are discussed elsewhere herein and shown in FIGS. 3 and 4.

For original claim 11. Sequential video frames are not necessarily contiguous frames. The term video should be broadly construed to include any device that generates a sequence of real, synthetic, aggregated or virtual image frames. Many alternative methods of averaging are discussed elsewhere herein.

For original claim 12. Hamming distance is discussed elsewhere herein. Hamming distance is also a term of the art. Embodiments are specifically claimed that compute a specific scalar, pair, vector, tensor, set, or distribution function corresponding to a logical and computable "distance," or similar appearance, between one or more current shapes and one or more reference shapes, such as are in a library. Non-limiting examples include L1, L2, Euclidian, least-squares, and Metropolis. Additional methods of computing "distance" are discussed herein.

For original claim 13. One embodiment generates a distribution table or vector comprising a confidence value or probability for each shape or for each symbol in the symbol library.

For original claim 14. This embodiment explicitly introduces the concept and element of a "selection set." For example, two animals in one cage may be marked (123) and (456) respectively. A selection set may consist only of the symbols and corresponding shapes for {1,2,3,4,5,6}. There are other reasons for a selection set. As one non-limiting example, one not-visible animal may be known to be not the animal whose marks are being read. In such a case, the selection set may have symbols and shapes removed, perhaps temporarily, that are only on such not-visible animals. The selection set may be altered during execution of the method, such as between iterations.

For original claim 15. The embodiment uses initial shapes from a font. Fonts are discussed elsewhere herein. A symbol library may contain a mix of shapes from a font and arbitrary shapes from a first read.

For original claim 16. This embodiment introduces the feature of using reads from multiple animals to create, such as by averaging, a shape in a symbol library. This embodiment has the advantage of using a wider base of shapes, and may be good at "predicting" a shape. A form of this embodiment, specifically claimed, tracks the age of the mark on the animal. Shapes in the symbol library are identified by age or age range. This permits marks on an animal that are, for example, between 12 and 18 months old, to be compared to other marks that are between 12 and 18 months old. One way to implement this embodiment is to "swap out" symbol libraries. Another way to implement this embodiment is to include multiple shapes per symbol and those shapes have an associated age or age range. This embodiment may or may not limit the comparing step to also being responsive to the age of the mark currently read on the animal.

For original claim 17. This embodiment is an independent claim that does selecting after multiple marks have been read and compared. It uses the output of all comparing steps for selecting. Also, the selection set typically includes only symbol groups that are expected. For example, if two animals in one cage are marked (123) and (456), all three marks on one animal are read and compared. The selection set then comprises {123 and 456}. The selecting selects the closest symbol group using all three comparing outputs. For example, it may add or average the confidence values for the each corresponding mark, then use this aggregated value to select whichever symbol group has the highest aggregate confidence, or the shortest "distance" to the read marks. Some embodiments use the word, "marks" in place of the word, "mark."

For original claim 18. Embodiments are claimed for any apparatus that implements one or more of any method embodiments.

For original claim 19. Embodiments are claimed for a vivarium that uses any of the apparatuses of original claim 18.

"Subset" may refer to an entire set. A subset may be null, depending on context.

In general, the letters that designate claim steps indicate a nominal order. However, as those trained in the art know, it is often an alternative to re-arrange the order of steps. Embodiments include all step ordering that enables an embodiment to function for the purpose intended. Claimed embodiments explicitly include any combination or permutation of: steps identified by letters and "wherein" clauses.

Embodiment Pseudo-Code

At is convenient to think of claim steps in terms of traditional programming syntax. This not only provides superior disclosure of the embodiments, but also enhances readability using syntax known in the art, rather than the extreme clumsiness of traditional claim style. Therefore, we provide "pseudo-code" for some embodiments. In some cases the scope and construction of claims may match exactly the embodiment as disclosed by such pseudo-code. However, not all claims and other embodiments have accurately matching pseudo-code herein. Pseudo-code should not be used to improperly restrict claim scope. Embodiments use "shape library for "symbol library," and vice-versa.

Numbering of pseudo-code embodiments and examples may not match claim numbering.

Syntax is generally as follows:

variable names and function names use underscores

"<-"—text notation (syntax) for assignment of the variable or constant on the right to variable name on the left.

"name1_funct {param_a, param_b}"—text notation (syntax) for executing a function or method of name1 that accepts as input param_a and param_b.

"value1++"—text notation (syntax) for incrementing an integer variable value1.

Objects not explicitly initialized may be assumed to be initialized to nul.

Iteration variables not explicitly initialized may be assumed to be initialized to value 1.

variables and function outputs may be scalars, pairs, vectors, tensors, arrays, distribution functions, or objects, and the like.

variables with a subscript in brackets, such as "var_name [i]," indicate an array, where typically each element in the array is associated with an iteration or sequence variable "i". This syntax also may indicate different instantiations of an object.

double slashes // demark comments

Embodiment 1—independent embodiment (a) shape library<-canonical symbol and its shape
(b) select a symbol and its shape<-from animal ID
(c) current_shape<-read tail mark
(d) compare_set<-compare_funct {current_shape, shape library}
(e) symbol<-select_funct {compare_set, identifier_options}
(f) animal identifier<-ID_funct {symbol}
(g) shape in shape library<-current_shape
(h) stop when the tail mark is no longer available, else: loop from (c).

steps (c) through (d) may be repeated for multiple reads and shapes, prior to the selecting in step (e). Identifier_options may be a selection set.

Embodiment 2—add more than one shape associated with one symbol in the shape library.

Embodiment 3—add location, as well as shape (a) shape library<-canonical symbol and its shape
(a') prior_location<-known tail location // pre loop
(b) select a symbol and its shape<-from animal ID (c) current_shape<-read tail mark
(c') tail_location<-read tail location
(d) compare_set<-compare_funct {current_shape, shape library}
(e) symbol<-select_funct {compare_set, identifier_options}
(e') select_location<-compare_location_funct {tail_location, prior_location}
(f) animal identifier<-ID_funct {selection}
(g) shape in shape library<-current_shape
(g') prior_location<-tail_location
(h) stop when the tail mark is no longer available, else: loop from (c).

Embodiment 4—add weighted running average
(a) current_shape, tail_shape<-canonical symbol and its shape
(a') history_of shapes[i]<-read tail symbol
(b) initialize selection value
(c) tail_shape<-read tail mark
(d) compare_set<-compare_funct {tail_shape, current_shape, history of shapes}
(e) selection<-select_funct {compare_set, identifier_options}
(f) animal identifier<-ID_funct {selection}
(f') history_of shapes [i]<-current_shape
(g) current_shape<-tail shape
(h) stop when the tail mark is no longer available, else: loop from (c).
// compare_set includes a weighted average of recent history_of shapes[i].

Embodiment 5—add backing up to a previous shape
(a) current_shape, tail_shape<-canonical symbol and its shape
(b) initialize selection value
(c) tail_shape<-read tail mark
(c') history_of shapes[i]<-read tail symbol
(c''') all_diff_values[i]<-compare_funct (tail_shape, history of shapes[i])
(c''') tail_shape<-minimum_funct (all_diff_values) // this is backup
(d) compare_set<-compare_funct {tail_shape, current_shape}
(e) selection<-select_funct {compare_set, identifier_options}
(f) animal identifier<-ID_funct {selection}
(g) current_shape<-tail shape
(h) stop when the tail mark is no longer available, else: loop from (c).

Note: this embodiment is useful for detailing with temporary or reversible degradation, such as detritus on a rodent tail, a wound, or makeup.

Embodiment 6—generate warning
(a) current_shape, tail_shape<-canonical symbol and its shape
(b) initialize selection value
(c) tail_shape<-read tail mark
(d) compare_set<-compare_funct {tail_shape, current_shape}
warning step may be here
(e) selection<-select_funct {compare_set, identifier_options}
(f) animal identifier<-ID_funct {selection}
(g) current_shape<-tail shape
(g') warning<-if threshold_funct {compare_set}
(h) stop when the tail mark is no longer available, else: loop from (c).

Validation steps or sub-steps may be added to any embodiment, where assignments are subject to one or more validations. Different assignments may use different valuations.

Additional Embodiments

Embodiment 7—wherein the printed identifier comprises a plurality of non-contiguous symbols. Examples include traditional numbers, with non-touching digits.

Embodiment 8—wherein the printed identifier comprises a plurality of contiguous symbols. Examples include bar codes, matrix codes, vine codes, and the like.

Embodiment 9—wherein the printed identifier comprises a one-dimensional barcode.

Embodiment 10—wherein the printed identifier comprises a two-dimensional matrix code.

Embodiment 11—wherein the printed identifier comprises a vine code.

Embodiment 12—wherein the marked identifier is tattooed on a rodent tail.

Embodiment 13—wherein the reading of a tail symbol comprises an averaging of image data from multiple sequential, but not necessarily contiguous or continuous video frames. Averaging is discussed in more detail above; additional embodiments are included in that discussion.

Embodiment 14—wherein the compare_funct comprises a computation of a hamming distance in a multi-dimensional space.

Embodiment 15—wherein a warning is generated if a current shape is too far from the original shape, as measured by the compare_funct.

Embodiment 16—wherein a warning is generated if a confidence falls below a threshold, wherein confidence is an output of the compare_funct.

Embodiment 17—generation zero or one in an iteration uses symbol shapes from a font.

Embodiment 18—wherein all prior shapes might be used in compare to "backup" to previously used reads. A "backup condition" might be a low confidence factor or a validation failure.

Embodiment 19—wherein any step, such as reading, comparing, selecting, or identifying, may provide two outputs, or two flags, one indicating that the output of that step is "good enough" to continue the steps of the method, and a second flag that indicates that the output of that step is "prime quality" and may be used to update a reference shape. In this embodiment updating the reference shape occurs only of the second flag is set. This embodiment may interpret the condition of the first flag set and the second flat not set as a "warning," This embodiment may interpret neither flag being set as a "no output" from that step, which would normally terminate that pass through the method. The generation of the two flags may be from two different method steps.

Embodiment 20—reads of the same symbol from different environments, such as different animals or from different cages are averages. This has the advantage of a larger base of samples, which is effective if degradation has similar parameters for different animals. Such averaging is most effective if averaging is only done for marks that have aged approximately the same amount of time since the original marking.

Embodiment 21—averaging is performed at the output of the comparing step. That is, the multiple output of the comparing step may be averaged each with the corresponding outputs of prior comparing steps. It is then this aggregated set of averages (the "averaged_compare_set") that is the input to the selecting step.

Embodiment 22—wherein the read step comprises a read validation such that the output of the read step may be either a valid read or "no read." In the case of "no read," that iteration through the method terminates.

Embodiment 201—no canonical shape, only the first read
(a) current_shape, tail_shape<-canonical symbol and its shape; symbol<-first read tail code
(b) initialize selection value
(c) tail_shape<-read tail mark
(d) compare_set<-compare_funct {tail_shape, current_shape}
(e) selection<-select_funct {compare_set, identifier_options}
(f) animal identifier<-ID_funct {selection}
(g) current_shape<-tail shape //current shape is the currently stored shape
(h) stop when the tail mark is no longer available, else: loop from (c).

Other embodiments are in applications other than reading rodent tail tattoos, such as those as discussed elsewhere herein. For such embodiments, "tail mark" should be construed broadly to comprise any object or element within an image that is to be used by the embodiment to determine a symbol or ID. "Tail shape" should be construed broadly to comprise an imaged shape of a mark, object or element. "Animal ID" should be construed broadly to comprise an appropriate identification of the mark, object or element, or a larger object comprising the mark, object, or element.

Terms "image" and "reading," in some embodiments, come from sources other than video cameras, still cameras, IR cameras, or x-ray machines, which output a two-dimensional image of a two- or three-dimensional scene or object. For example, CAT and MRI forms of synthetic image creation are claimed embodiments of reading. Embodiments also comprise aggregated images, spectroscopic images, virtual images and 3D images.

Definitions

Animal Identifier—a permanent animal marking used for the purpose of uniquely identifying a marked animal. The animal identifier does not change. Example: animal ID "348." Animal identifier is to be construed broadly, as discussed elsewhere herein.

Compare function—a compare function may have either an implied or a specified set of options as input, such as digit shapes, barcode shapes, alpha shapes, or arbitrary shapes. The output of the compare function may be a distribution curve in one or more dimensions. For example, an output may be a set of confidence values of each shape in the set of options. A compare function may be a known image comparison algorithm known in the art (or a new algorithm), or a hybrid of known and embodiment-specific algorithms or parameters.

An initial compare set might be, for example, for digits 0 to 9, when the known digit tattooed (or to be tattooed) on the animal is "3", an array of ten values, each value being a confidence value for the ten digits respectively, with all values set to zero except value for "3", which is set to one. This function would then be a confidence function for the ten digits. The ten digits is an implied option set. As another example, a compare set might consist of only the digits 3 and 5. However, other functions might not have an implied option set. The compare function might have to determine what that option set contains. In such a case, the output of the compare function might be value+confidence pairs. Such values need not be scalars. They may be vectors, tensors or distribution functions, for example. Confidence values are traditionally expressed as a range between 0 and 1, inclusive, but other ranges are possible.

A compare set may comprise elements in the abstract, such as actual numbers. It may comprise symbols representing those abstract elements, such as specific characters in a specific font. It may comprise shapes associated with either the abstract elements or the symbols, such as a video image, still image, or bitmap. A compare set may be fixed over time, or it may be update under a set of defined conditions.

Mark—some glyph actually marked on the animal. Reading the mark (with a camera) then causes the mark to be assigned to a current shape (perhaps with some image enhancement first, but not using pattern recognition).

Select function—takes as input the compare function, and optionally an implied or a specified set of options as input, such as digit shapes, barcode shapes, alpha shapes, and outputs one or more values, such as an identifier and a confidence value (or more than one such pair). The select function may be viewed as a selection step taking as input the output of the compare function. The select function may be specific to the application or embodiment. A select function is possibly a pass-through function if the output of the compare function is adequately narrow to use directly for the animal identifier. An example of a select function is to take a maximum value from the compare function and select the corresponding shape from the set, if the confidence factor is above a threshold.

A compare function might only output one value. In which case the select function would use that value. It might, however, also use a confidence value to decide if a warning or failure should be generated.

A select function may be to select the corresponding value that has the highest confidence. It may consider a minimum confidence requirement to generate a single valid, output. A selection function might generate two or more values. A secondary function, such as one that determines validity of a then computed animal ID, may be used to then determine which of multiple options is to be used.

A select function may provide an output conditionally. That is, it may output, "no selection." It may provide a confidence factor. It may provide an alternate selection. An alternative selection is valuable when a later validation step fails using the first selection, but passes using the alternate selection.

Shape—The actual shape of letter, digit or bar code portion. It is the shape that morphs over time. Example: the shape of the digit "3", including changes to the shape of the "3" on the animal over time. Shape is prior to any pattern recognition, but may use image enhancement.

Symbol—The fixed meaning of a shape. Example, the shape of the "3" is associated with the actual digit "3."

Vine code—a code, generally machine-readable, generally not commonly human-readable, comprising a series of line segments of varying lengths, or varying positions, or both. Typically the line segments are placed parallel to each other with a gap in between. An axis may be defined perpendicular to such parallel line segments. The line segments may have one end aligned with the axis or may, in some cases, cross or not cross the axis depending on the choice of the line segment. Data is encoded in in the vine code by the variations in line length or position. Each line segment is called a leaf. The vine code may or may not have starting or ending line segments, or both. Such starting or ending line segments may or may not encode data. Some leaves in some codes are missing. Generally, all line segments are equally spaced relative to the axis. The axis may or may not be printed or readable. A vine code may be marked in visible ink or may be marked using some other readable technology, including infrared, ultraviolet or magnet material. A vine code may be overlaid with another code such that they can be read independently. For example, a vine code may be printed in infrared ink while a human-readable marking is printed overlaid in violet or blue ink. Filters may then be used to select one code over the other for reading. A human eye would not normally be able to see the infrared or ultraviolet ink.

Verbs v. Nouns—Syntax for usage in English and syntax for usage in claims are different. A step in a method claims may end in -ing, for example, "Animal Identifying." However, in English, discussion directed to that step may refer to "Animal ID" or "Identification," as examples. That is, in English, usage of a noun may imply an action.

Intermediate programming structures. In a programming language, the output of a function or method is an identified variable, structure or object. However, in claim syntax, any such intermediate variable, structure or object may be implied by the use of "responsive to."

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims.

What is claimed is:

1. A method of computing an animal identifier, for an animal comprising a mark, comprising the steps:
   (a) selecting a symbol library comprising symbols, each symbol having an associated shape in the library;
   (b) using a predetermined symbol from the symbol library, assigning the associated shape to a current shape and to a prior shape;
   (c) reading the mark on the animal, and deriving the now current shape from the read mark;
   (d) comparing the current shape to the shapes in the symbol library;
   (e) selecting the symbol responsive to the comparing;
   (f) computing the animal identifier responsive to the symbol;
   (g) updating the prior shape in the symbol library to now equal the current shape;
   (h) repeating from step (c) until the mark is no longer available for reading.

2. The method of claim 1:
   wherein the predetermined symbol in the symbol library is associated with at least one additional shape; and
   wherein the associated shape in step (b) is a selected shape from all the associated shapes with the predetermined symbol.

3. The method of claim 1 comprising the additional steps:
   (b') assigning a known location on the animal to a prior location and to a current location;
   (c') updating the current location from the reading the mark on the animal;
   (e') updating the prior location responsive to the current location;
   wherein steps (b'), (c') and (e') occur after steps (b), (c) and (e) respectively.

4. The method of claim 1:
   (a') initializing a history of shapes;
   wherein the comparing is additional responsive to the history of shapes;
   wherein the updating step comprises updating the history of shapes responsive to an averaging of the current shape with a subset of shapes in the history of shapes;
   wherein step (a') occurs prior to step (c).

5. The method of claim 4 comprising the additional step:
   (g") re-updating the history of shapes to remove recent shapes responsive to the comparing;
   wherein step (g"), occurs after step (g).

6. The method of claim 1 comprising the additional steps:
   (g''') warning responsive to the comparing;
   wherein step (g'''), occurs after step (g).

7. The method of claim 1:
   wherein the animal comprises multiple marks and the multiple marks are non-continuous.

8. The method of claim 1:
   wherein the animal comprises multiple marks and the multiple marks are continuous.

9. The method of claim 8:
   wherein the animal comprises multiple marks and multiple marks form a vine code with a spine.

10. The method of claim 1:
    wherein the animal is a rodent and the mark is tattooed on the rodent tail.

11. The method of claim 1:
    wherein the reading comprises an averaging of multiple sequential video frames.

12. The method of claim 1:
    wherein the comparing comprises computing a hamming distance in a multi-dimensional space.

13. The method of claim 1:
    wherein the comparing comprises outputting a distribution table comprising a probability for each shape in the symbol library.

14. The method of claim 1 comprising the additional step:
(a") selecting a selection set comprising symbols;
wherein the selecting selects a symbol from the selection set.

15. The method of claim 1:
wherein at least some of the symbols in step (a) are a subset of a font.

16. The method of claim 1 comprising the additional steps:
(i) updating the symbol library responsive to separate reading, comparing, selecting and validating steps on a different animal for the same symbol selected in step (e);
wherein step (i) is performed before or after step (h).

17. An apparatus using the method of claim 1 to identify the animal in a cage comprising an additional animal.

18. A vivarium comprising multiple apparatuses of claim 17 for multiple cages in the vivarium.

19. A method of computing an animal identifier, for an animal comprising a mark, comprising the steps:
(a) selecting a symbol library comprising symbols, each symbol having an associated shape in the symbol library;
(a''') selecting a selection set comprising symbol groups;
(b) using a predetermined symbol from the symbol library, assigning the associated shape to a current shape and to a prior shape;
(c) reading the mark on the animal, and deriving the now current shape from the read mark;
(d) comparing the current shape to the shapes in the symbol library;
(d') repeating steps (c) through (d) for additional marks on the animal;
(e) selecting a symbol group from the selection set, responsive to the comparing in multiple steps (d);
(f) computing the animal identifier responsive to the symbol group;
(g) updating the symbol library responsive to the multiple current shapes from multiple steps (c), subject to validating;
(h) repeating from step (c) until the mark is no longer available for reading.

* * * * *